United States Patent [19]

Hasegawa

[11] Patent Number: 4,777,532
[45] Date of Patent: Oct. 11, 1988

[54] PROJECTION APPARATUS FOR A PROJECTION TELEVISION RECEIVER

[75] Inventor: Shinichi Hasegawa, Tokyo, Japan

[73] Assignee: Pioneer Electronic Corporation, Tokyo, Japan

[21] Appl. No.: 892,854

[22] Filed: Aug. 4, 1986

[30] Foreign Application Priority Data

Aug. 6, 1985 [JP] Japan .............. 60-120375[U]
Aug. 6, 1985 [JP] Japan .............. 60-120377[U]

[51] Int. Cl.$^4$ .............. H04N 5/65; H04N 7/74
[52] U.S. Cl. .............. 358/231; 358/237; 358/245
[58] Field of Search ........ 358/60, 64, 231, 237, 23 P, 358/245, 247, 254, 255; 313/45

[56] References Cited

U.S. PATENT DOCUMENTS

| | | | |
|---|---|---|---|
| 3,952,152 | 4/1976 | Lill | 358/245 |
| 4,150,320 | 4/1979 | Mitchell | 358/250 |
| 4,511,927 | 4/1985 | Bauer | 358/321 |
| 4,529,905 | 7/1985 | Ohkoshi | 358/245 |
| 4,609,945 | 9/1986 | Oguino | 358/64 |

FOREIGN PATENT DOCUMENTS

230237 12/1984 Japan .............. 358/237

Primary Examiner—Tommy P. Chin
Attorney, Agent, or Firm—Finnegan, Henderson, Farabow, Garrett, and Dunner

[57] ABSTRACT

A projection apparatus for a projection television receiver comprises a projection tube for receiving video signals and projecting images therefrom; a lens aligned for focusing images from the tube; a frame for supporting the tube in alignment with the lens and defining a cooling chamber between the lens and the tube; a first seal to seal the lens to the frame under substantially uniform pressure with no substantial bending stress on the lens; and a second seal to seal the tube to the frame under substantially uniform pressure.

6 Claims, 10 Drawing Sheets

PROJECTION APPARATUS FOR A PROJECTION TELEVISION RECEIVER

BACKGROUND OF THE INVENTION

The present invention generally relates generally to a projection apparatus for projecting a picture onto a screen, in a projection television receiver.

Figure 1:
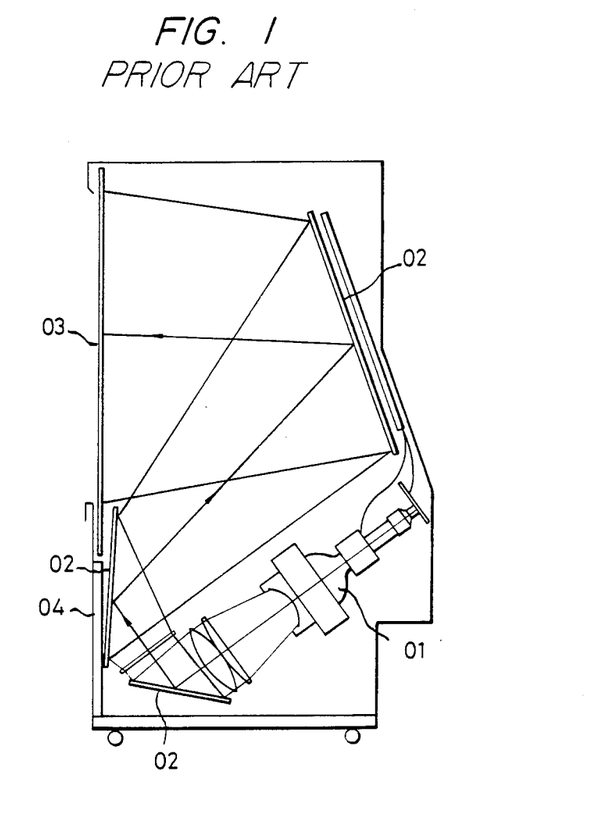
FIG. 1 is a diagram showing the whole arrangement of a conventional projection television receiver.

As shown in FIG. 1, a projection television receiver generally comprises a projection cathode ray tube 01 for reproducing a television signal or the like, a group of reflection mirrors 02 for reflecting light emitted from the projection cathode ray tube 01, a screen 03 for receiving reflected light so as to project an enlarged picture thereon, and a television receiver cabinet 04. The present invention particularly relates to an improvement of the projection cathode ray tube 01.

Figure 2A:
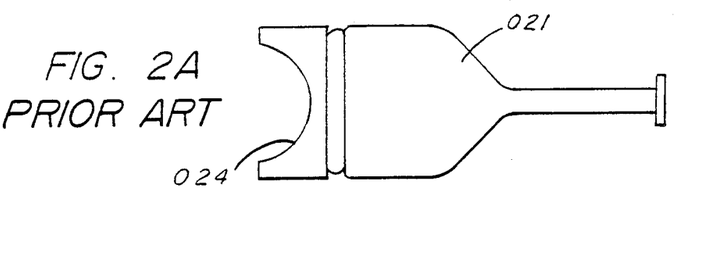
FIGS. 2A, 2B, and 2C are schematic diagrams showing various examples of conventional projection cathode ray tubes in projection television receivers.
Figure 2B:
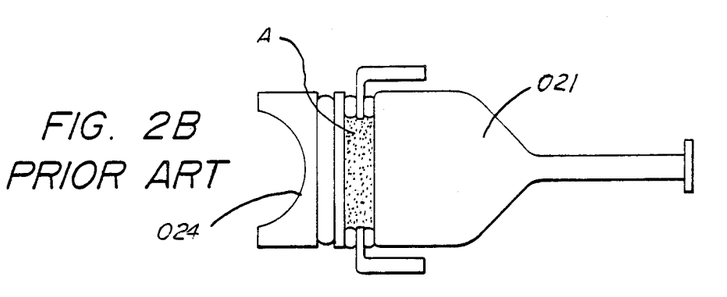
Figure 2C:
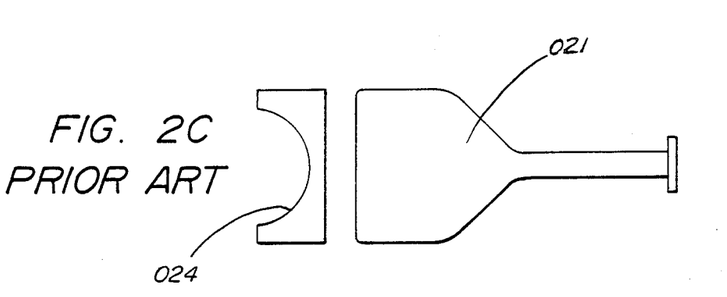

Referring to FIG. 1, the conventional projection apparatus in a projection television receiver will be described hereafter. FIGS. 2A, 2B, and 2C shows various examples of the apparatus such as that of FIG. 1. FIG. 2A shows an example of a projection apparatus having a projection cathode ray tube 021 and a lens 024 which are coupled to each other with silicone-gel. In this example, there have been problems of reduction in heat resistance, and generation of thermal transformation/distortion in the projection cathode ray tube 021 when the temperature at the projection face of the tube 021 has reached a high value. FIG. 2B shows another example of a projection apparatus in which a coolant A is disposed between a tube 021 and a lens 024 in order to prevent the generaton of heat by the projection cathode ray tube 021. In this example, the coolant A may evaporate or leak through a packing, thereby allowing the projection face of the tube 021 to reach a high temperature. Thus, there is still a potential problem of thermal transformation/distortion of the projection cathode ray tube 021. FIG. 2C shows a further example of a projection apparatus in which a projection cathode ray tube 021 and a lens 024 are spaced from each other in order to allow the heat from the projection cathode ray tube 021 to dissipate by air cooling. In this example, dust may adhere to the projection face of the tube 021 because of static electricity, or a transmittance loss may be caused because the image carrying light passes through materials having different refractive indices. Therefore a high-quality picture is not always obtained.

An object of the present invention is therefore to eliminate the foregoing disadvantages in the prior art.

Another object of the present invention is to provide a projection apparatus in a projection television receiver, in which a lens adjacent to a projection cathode ray tube is prevented from being transformed/distorted by heat from the projection cathode ray tube.

A further object of the present invention is to provide a projection apparatus in a projection television receiver, in which a cooling liquid for cooling the projection face of the projection cathode ray tube is prevented from leaking.

A still further object of the present invention is to provide an inexpensive projection apparatus in a projection television receiver, in which the transmission factor is maintained at a high level, and in which a high-quality picture having a high contrast ratio can be obtained consistently.

The above objects, features, and advantages of the present invention will be apparent from the following description taken in conjunction with the accompanying drawings.

SUMMARY OF THE INVENTION

To achieve the foregoing objects and advantages, the projection apparatus of the present invention comprises a projection tube for receiving video signals and projecting images therefrom; a lens aligned for focusing images from the tube; a frame for supporting the tube in alignment with the lens and defining a cooling chamber between the lens and the tube; and sealing means for sealing the lens and the tube to the frame in a fluid-tight manner, including means for pressing the lens against the frame under a substantially uniform pressure with no substantial bending stress on the lens.

Preferably, the lens includes an enlarged collar, and the pressing means includes an adapter plate sized for close-fitting relation over the collar, and a resilient lens seal disposed between the collar and the frame. It is also preferred that the collar include a raised portion for abutting the plate in substantially direct alignment with the lens seal when the collar is pressed against the lens seal by the plate.

Preferably, the tube includes a face, and the lens and the projection tube face are substantially rectangular. The sealing means also may include a resilient tube seal disposed between the tube and the frame.

It is preferred that the lens have a substantially curved central portion of a predetermined radius of curvature, and four cut-off sides of substantially uniform thickness, adjacent ones of the sides being substantially perpendicular to each other. The collar may include an annular wall surrounding the lens, the portions of the wall adjacent to the sides being substantially perpendicular to the sides.

The term "television receiver" is intended to mean a television receiver, a monitor or the like.

BRIEF DESCRIPTION OF THE DRAWINGS

The accompanying drawings, which constitute a part of the specification, illustrate embodiments of the invention and, together with the description, serve to explain the principles of the invention.

DETAILED DESCRIPTION OF THE PREFERRED EMBODIMENTS

Referring to the accompanying drawings, embodiments according to the present invention will be described hereunder. In the illustrated embodiments, description is made as to one of three monochromatic projection cathode ray tubes constituting a projection television receiver.

Figure 3:
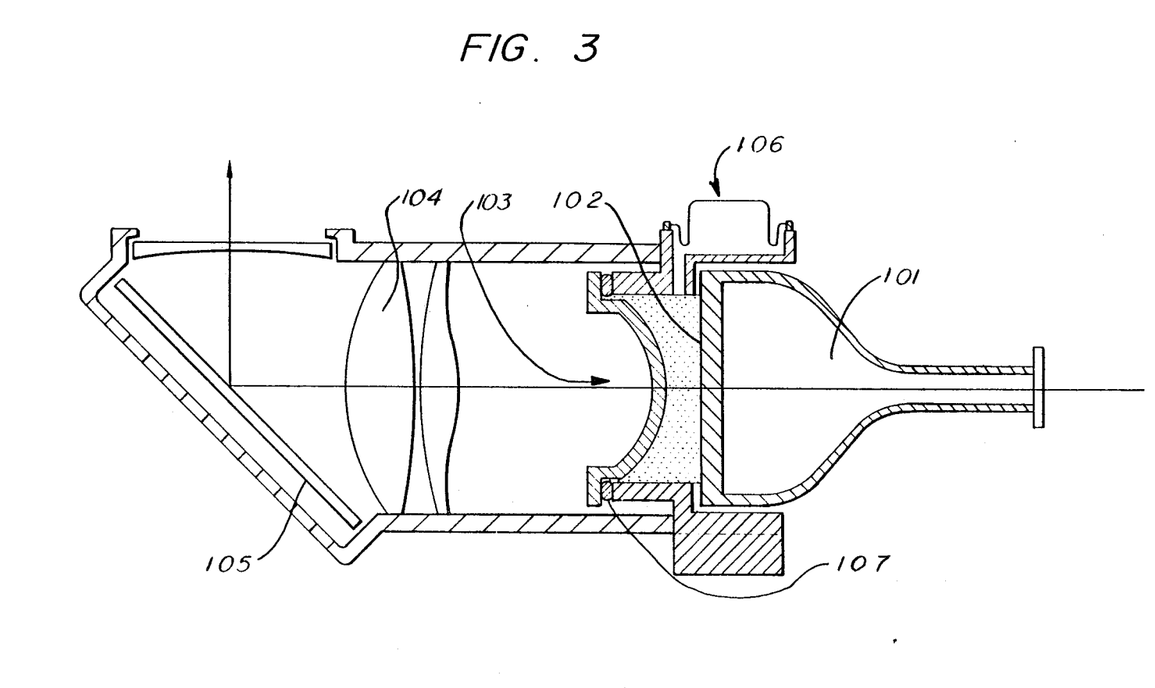
FIG. 3 is a schematic diagram showing the projection cathode ray tube and the lens according to the present invention.

FIG. 3 shows a large size hybrid aspherical lens and liquid cooling optical coupling in the projection apparatus according to the present invention. In the drawing, the reference numeral 101 designates a projection cathode ray tube; 102, a fluorescent surface; 103, a liquid lens and coolant; 104, an aspherical lens; 105, a combiner and radiator; 106, a pressure control valve; and 107, a seal.

Figure 4:
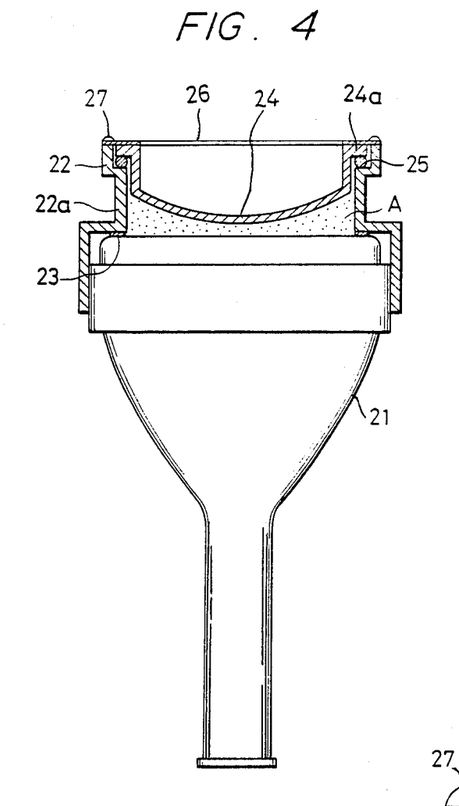
FIG. 4 is a cross sectional view of a first embodiment according to the present invention.
Figure 5:
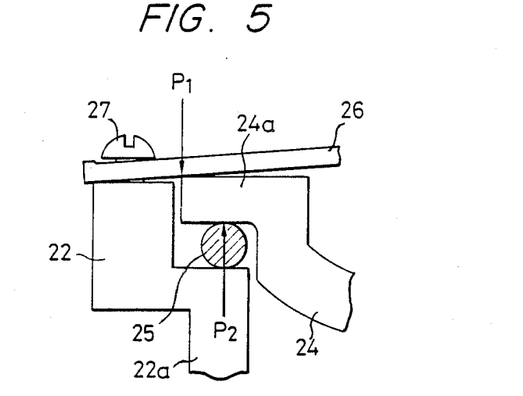
FIG. 5 is an enlarged cross sectional view of a main part of the FIG. 4 embodiment.

FIGS. 4 and 5 show a first embodiment of the projection apparatus in a projection television receiver, according to the present invention, in detail.

Referring to FIGS. 4 and 5, the projection apparatus in a projection television receiver according to the invention will be described.

In the drawings, a frame 22 has a step portion 22a, and a projection face of a projection cathode ray tube 21 is fixed through an adhesive agent 23 to the frame 22 at one side of the step portion 22a. A lens 24 has a collar portion 24a which is mounted through a packing 25 on the frame 22 at the other side of the step portion 22a. A pressing plate 26 is fixed to the frame 22 at its edge portion by screws 27. When the screws 27 are tightened, the lens 24 is urged against the packing 25 to distort or flatten it and fix the lens 24 to the frame 22 at its step portion. A space defined between the projection face of the projection cathode ray tube 21 and the lens 24 is filled with cooling liquid A. The cooling liquid A has substantially the same refraction index as the lens 24 and acts also as a liquid lens. Therefore, the transmittance loss of light projected from the projection cathode ray tube 21 through the lens 24 is sufficiently small so that a high-quality picture can be obtained. Table 1 shows the characteristics of the cooling liquid A.

TABLE 1

| | |
|---|---|
| (1) Melting point (°C.) | −75.3 |
| (2) Boiling point (°C.) | 205 |
| (3) Thermal expansion (25° C.–85° C.) | $6.47 \times 10^{-4}$/°C. |
| (4) Flash point (C.°) | 132 |
| (5) Component | Specially developed coolant (under patent application) |
| (6) Water evaporability | Low evaporation |
| (7) Corrosiveness | Corroding neither metals nor plastics |
| (8) Refractive index (25° C.) | 1.442 |

In the thus arranged projection apparatus, a pressing for $P_1$ is exerted from the pressing plate 26 to the collar portion 24a of the lens 24 when the screws 27 are tightened. Thus force $P_1$ is shifted in position or offset from a force of repulsion $P_2$, exerted from the step portion 22a of the frame 22 through the packing 25. Thus, bending stress acts on the collar portion 24a of the lens 24.

Further, when a signal is applied to the projection cathode ray tube 21 and the projection cathode ray tube 21 becomes heated, the cooling liquid A is also heated, so that the temperature thereof rises to about 75° C.

When the lens 24 is made of a plastic material, such as an acrylic resin, polycarbonate, or the like, there is a risk of leakage of the cooling liquid A. This is due to cracks or gaps that may be generated in the collar portion 24a of the lens 24 by the bending stress, expansion of the cooling liquid A, and improper tightening of the screws 27.

In order to solve the foregoing problems, the inventors of this application provide a second embodiment, in which, as shown in FIGS. 6 through 12, a pressing force from a lens adapter plate is exerted onto a collar portion of the lens at a position corresponding to the position on the opposite surface of the lens at which a packing contacts the lens. Thus, the collar portion of the lens is not subjected to any bending stress, but only compression stress. Therefore, the lens is not affected by heat or by expansion of the cooling liquid.

DESCRIPTION OF THE PREFERRED EMBODIMENT

Referring to the drawings, the present preferred embodiment now will be described. In the illustrated embodiment, description is made as to one of three monochromatic projection cathode ray tubes constituting a projection television receiver.

Figure 6:
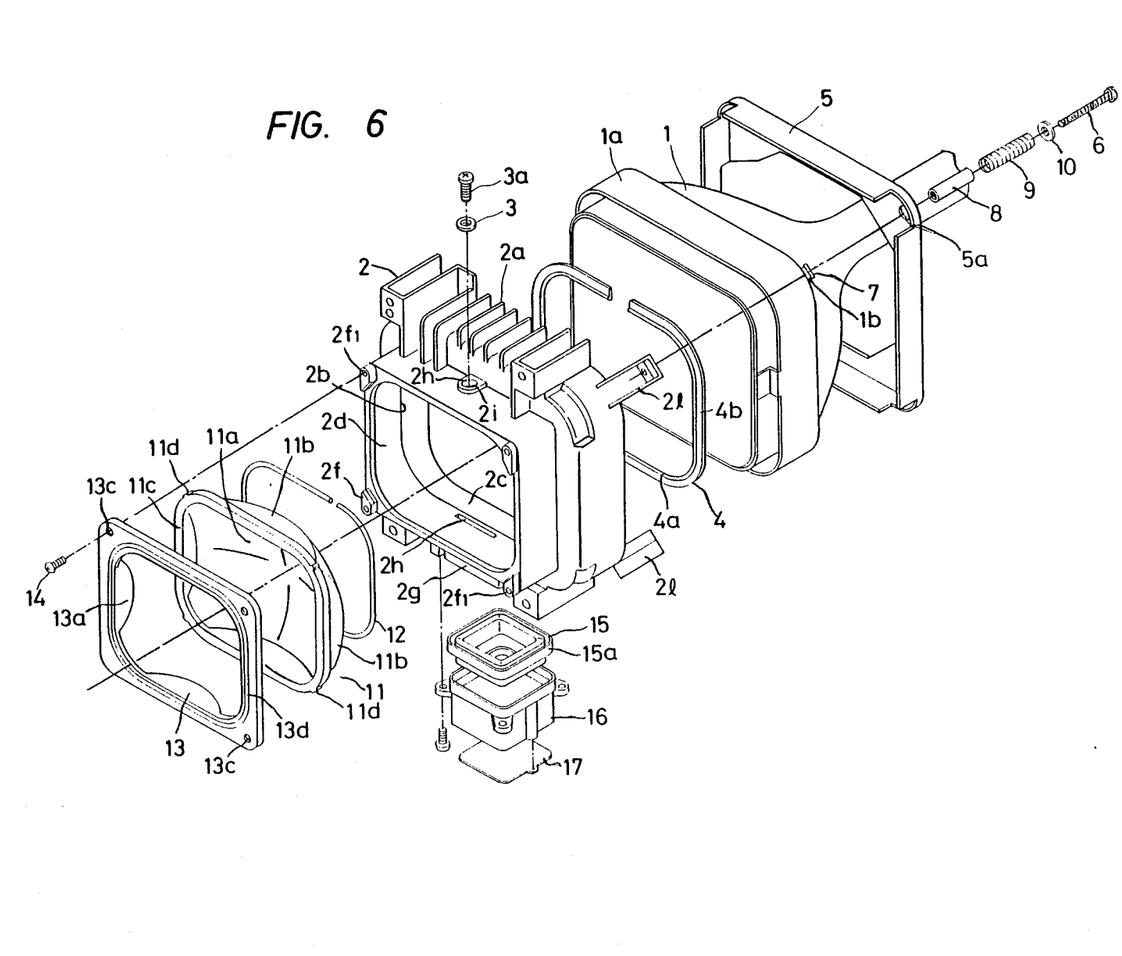
FIG. 6 is an exploded perspective view showing a second embodiment according to the present invention.
Figure 7:
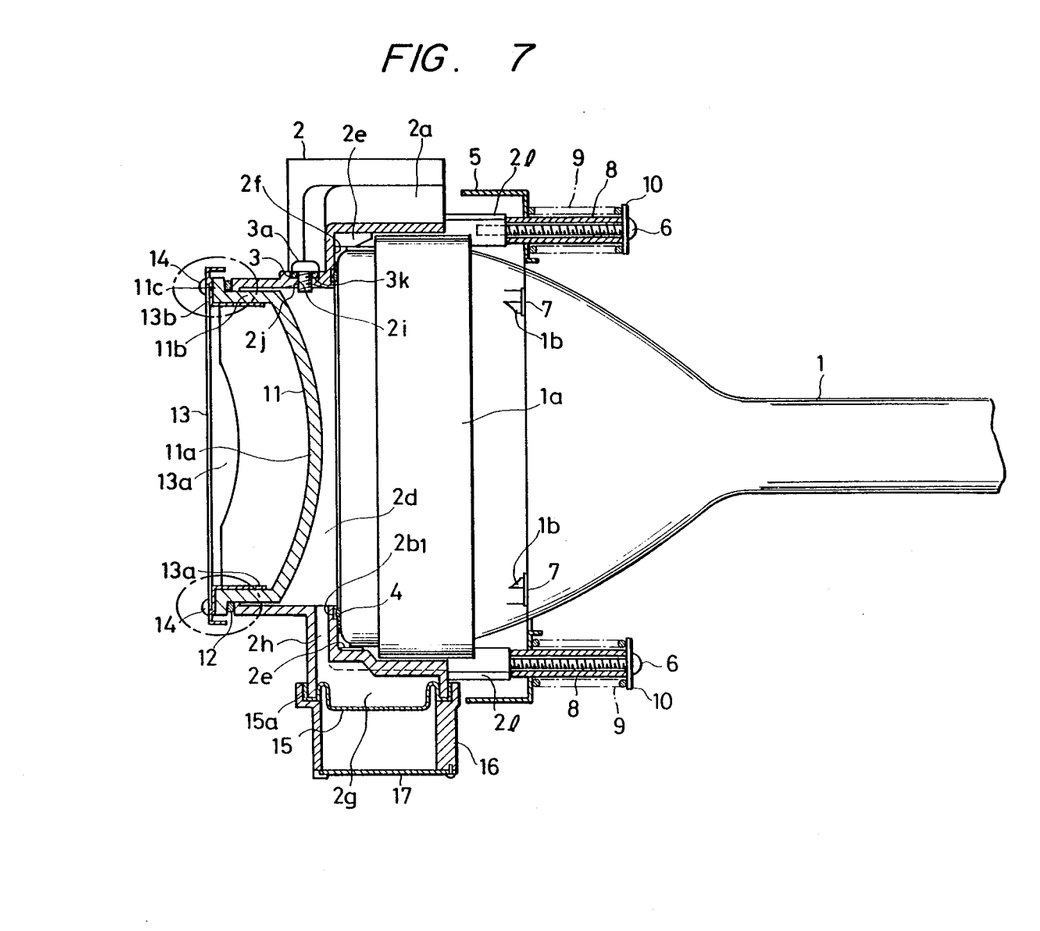
FIG. 7 is a cross sectional view of the FIG. 6 embodiment is assembled form.
Figure 8:
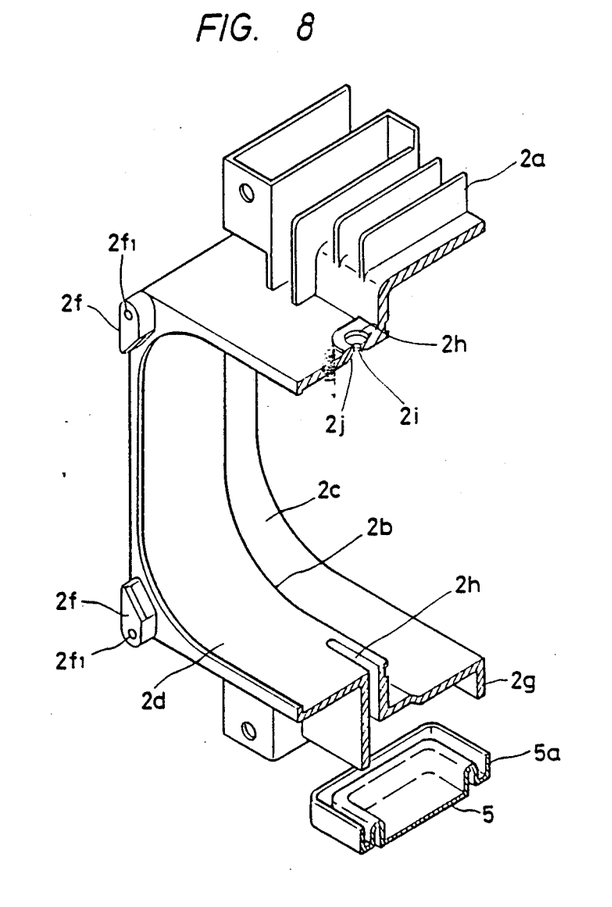
FIG. 8 is a sectional perspective view of the frame portion of the FIG. 6 embodiment.
Figure 9:
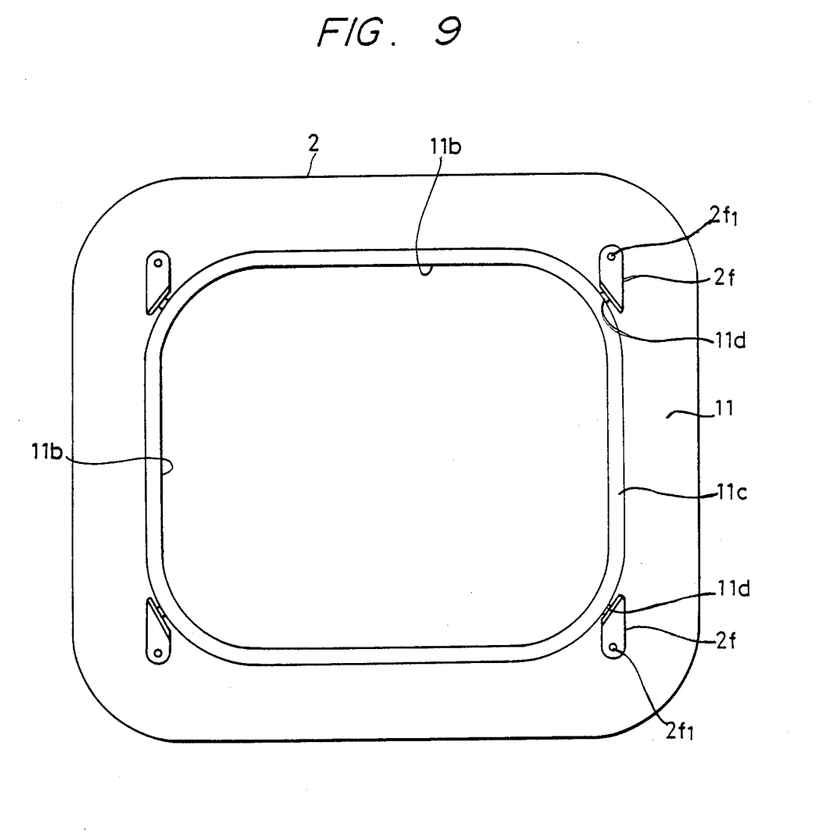
FIG. 9 is a front view showing the assembly of the lens and the frame according to the FIG. 6 embodiment.
Figure 10:
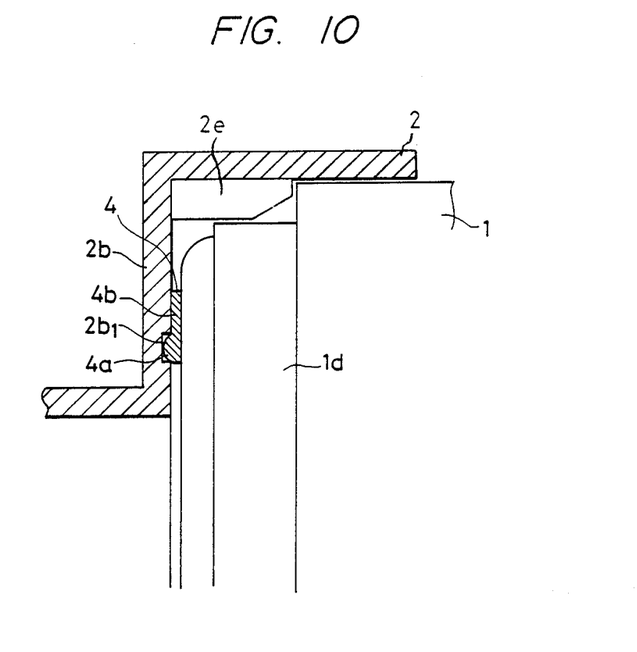
FIGS. 10 and 11 are enlarged cross sectional view of parts of the assembly of FIG. 7.

Referring to FIGS. 6–12, especially FIGS. 6 and 7, a projection cathode ray tube 1 is provided with a metal belt 1a secured to a side edge outer periphery thereof close to a fluorescent screen thereof for interrupting emission of X-rays. A frame 2 of die-cast aluminum is provided with a large number of fins 2a formed on an upper portion of an outer peripheral surface thereof. A step portion 2b is located at an inner central portion of the frame 2 to form a large-sized chamber 2c for mounting the projection cathode ray tube 1 therein. This projection cathode ray tube chamber 2c is formed at one side of the step portion 2b, and a small-sized chamber 2d for enclosing a cooling liquid A (described later), is formed at the other side of the step portion 2b.

Respective protrusions 2e are formed at the four corners of the inner surfaces of the side walls defining the projection cathode ray tube chamber 2c, such that the protrusions 2e abut on the side edge outer periphery of the projection cathode ray tube 1. This disposes the projection cathode ray tube 1 in position on the frame 2. Respective protrusions 2f, on the other hand, are formed at the four corners of the end surfaces of the side walls defining the cooling liquid chamber 2d, such that the protrusions 2f abut on small protrusions 11d of a lens 11, described later. This disposes the lens 11 in position on the frame 2. Thus, the center line of the projection cathode ray tube 1 is made coincident with that of the lens 11 because the projection cathode ray tube 1 and the lens 11 can be disposed in position on teh frame 2.

Further, a through hole 2h is formed in the frame 2. One end of the through hole 2h is opened to the inside of the lower side wall defining the cooling liquid chamber 2d, and the other end of the through hole 2h is opened to a pressure regulating chamber 2g formed under the lower side wall defining the projection cathode ray tube chamber 2c. A cooling liquid pouring hole 2i is formed at a center portion of the upper side wall defining the cooling liquid chamber 2d. The upper surface of the upper side wall is tapered toward the cooling liquid pouring hole 2i. The upper side wall also has a lower taper surface 2j, tapered to the lower edge of the cooling liquid pouring hole 2i so that the upper side wall defining the cooling liquid chamber 2d has double taper surfaces. A large diameter hole portion 3k is formed at the upper end of the cooling liquid pouring hole 2i, so that the packing 3 can be fitted into the large diameter hole portion 3k.

A thin-plate ring-like rectangular packing 4 is provided with an expanded inner edge portion 4a, which is rectangular in cross-section and which is sized to fit into a slot 2b₁ formed in the inner surface of the step portion 2b of the frame 2.

A metal pressing plate 5 is inserted onto the projection cathode ray tube 1 from the rear for fixing the projection cathode ray tube 1 on the frame 2.

The projection cathode ray tube 1 is inserted into the frame 2 with the projection face of the projection cathode ray tube 1 facing the projection cathode ray tube chamber 2c of the frame 2. The projection face of the projection cathode ray tube 1 comes into abutting contact with the packing 4, because the packing 4 has been disposed in the slot 2b₁ of the step portion 2b of the frame 2. The pressing plate 5 is inserted onto the projection cathode ray tube 1 from the rear, and respective screws 6 are inserted into through holes 5a of the pressing plate 5 to be tightened into frame attaching pillar portions 2l. This fixes the projection cathode ray tube 1 securely on the frame 2. The pressing plate 5 abuts, via elastic materials 7, against supporting portions 1b which project from the back surface of the projection cathode ray tube 1. Thus, the projection cathode ray tube 1 is attached onto the frame 2 so that the packing 4 is deformed by the fastening force of the screws 6 (at four corners of the pressing plate 5).

If the pressing force of the projection cathode ray tube 1 exerted onto the whole packing 4 is not uniformly applied, a gap may be partially produced between the projection cathode ray tube 1 and the frame 2. This allows the cooling liquid to leak through the gap even when small amounts of vapor are produced, as will be described later. Therefore, it is necessary to uniformly fasten the pressing plate 5 onto the frame 2. In this embodiment, accordingly, a spacer 8 is inserted into each of the holes 5a of the pressing plate 5 so that one end of the spacer 8 abuts on the respective frame attaching pillar portion 2l. A spring 9 is fitted onto the outer periphery of the spacer 8 with one end of the spring 9 made to abut on the pressing plate 5. Then, the respective screw 6 with a washer inserted thereto is screwed into the corresponding frame attaching pillar 2l through the spacer 8, and fastened so as to make the washer 10 abut against the other end of the spacer 8. This compresses the spring 9. As a result, the pressing plate 5 presses the projection cathode ray tube 1 at four portions thereof by the spring force of the springs 9 to urge the projection cathode ray tube 1 against the packing 4 under a uniform pressing force. Thus, no gap is generated between the step portion 2b of the frame 2 and the projection face of the projection cathode ray tube 1.

The lens 11 made of acrylic resin or the like has only one curved surface 11a with a predetermined radius of curvature, and includes four sides which are cut-off so as to form right angles between adjacent sides thereof so as to appear rectangular in plan view. A perpendicular wall portion 11b is formed in each of the four cut-off sides and a collar portion 11c is formed integrally with the lens 11 along the whole periphery thereof.

The four corners of the lens surface 11a are rounded in order to prevent a crack from being generated at the corner portions when a pressure is applied to the curved surface 11a in this embodiment. However, it is not always necessary to round the corners. Further, small protrusions 11d are formed at corner portions of the collar portion 11c so as to abut on the protrusions 2f of the frame 2, respectively.

A packing 12 having a circular cross-section is fitted on the collar portion 11c of the lens 11. A metal lens adapter plate 13 is sized to surround the collar portion 11c of the lens 11. Light-shading portions 13a, sized for fitting on inner surfaces of the respective perpendicular wall portions 11b of the lens 11, are formed integrally with the lens adapter plate 13. A step portion 13b, arranged for mating with the collar portion 11c of the lens 11, is formed in the lens adapter plate 13.

The lens 11 is disposed on the end surface of the side wall constituting the cooling liquid chamber 2d of the frame 2 with the curved surface 11a made to face the lens adapter plate 13. The packing 12 is interposed between the collar portion 11c of the lens 11 and the end surface of the side wall defining the cooling liquid chamber 2d. The small protrusions 11d of the lens 11 are made to abut on the side surfaces of the protrusions 2f of the frame 2, respectively, to thereby guide the lens 11 in to position on the frame 2.

The lens adapter plate 13 surrounds the collar portion 11c of the lens 11. Respective screws 14 are inserted into holes 13c formed in the four corners of the lens adapter plate 13, and are tightened into screw holes 2f₁. The holes 2f₁ are formed in upper surfaces of the protrusions 2f of the frame 2. Thus, the lens 11 is securely fixed on the frame 2. The collar portion 11c of the lens 11 is attached on the frame 2 in sandwich relationship between the step portion 13b of the lens adapter plate 13 and the packing 12. Thus, only compression stress is exerted onto the collar portion 11c, with no bending stress.

Figure 11:
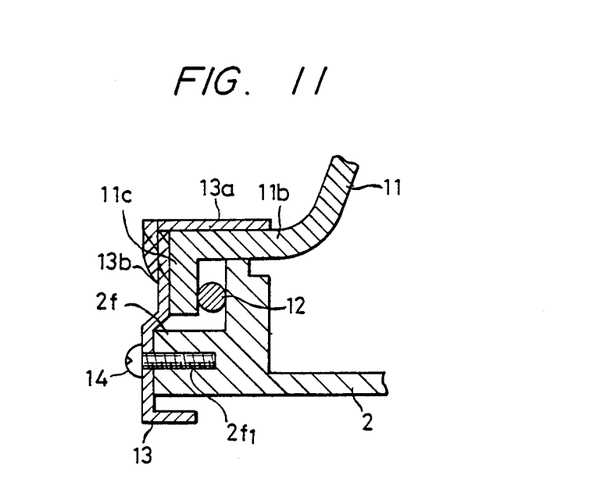
Figure 12:
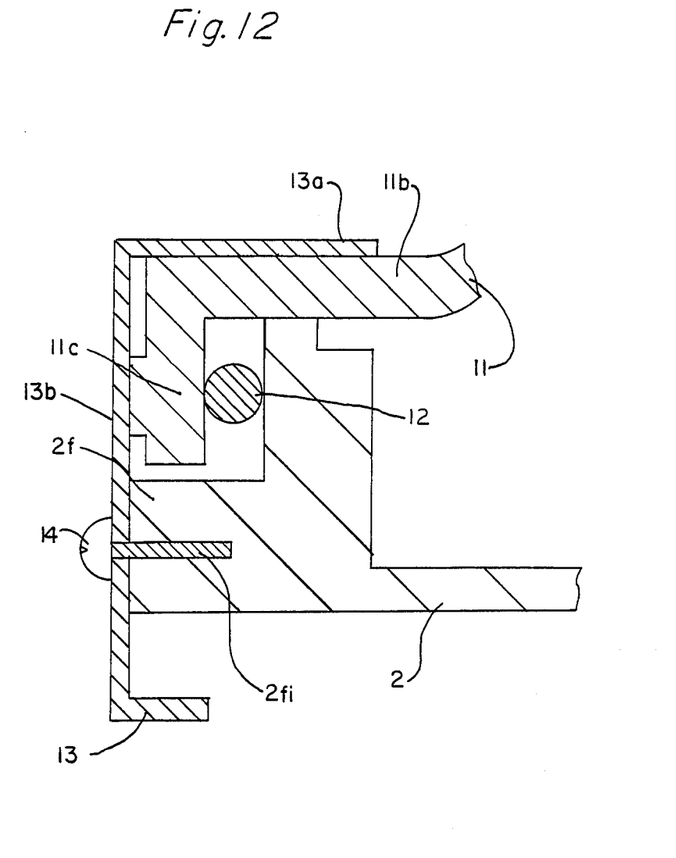
FIG. 12 is an enlarged cross-sectional view similar to FIG. 11 of another embodiment of the part shown in FIG. 11.

Although the step portion 13b is formed in the lens adapter plate 13 in this embodiment shown in enlarged form in FIG. 11, a projection alternatively may be formed on the collar portion 11c of the lens 11 at a position opposite to the lens adapter plate 13 as shown in FIG. 12.

At least the light-shading portions 13a of the lens adapter plate 13 are made opaque, for example, by being painted black, so that light transmitted through the lens 11 is not reflected by the lens adaptor plate 13.

The pressure regulating chamber 2g of the frame 2 is covered with a diaphragm 15. A fastening ring 16 is fitted on the outer periphery 15a of th diaphragm 15 and fixed on the frame 2 by screws. Thus, the diaphragm 15 is fixed at an opening portion of the pressure regulating chamber 2g of the frame 2 by the fastening ring 16. An opening of the fastening ring 16 is covered by a cap 17.

The operation of the projection apparatus according to the present invention will now be described.

First, the projection cathode ray tube 1 is mounted onto the projection cathode ray tube chamber 2c of the frame 2 having the fins 2a. At this time, the packing 4 is disposed in the slot 2b₁ of the step portion 2b, and the projection face of the projection cathode ray tube 1 is caused to abut against the packing 4. In this state, the four-corner portions of the projection cathode ray tube 1 abut against the protrusions 2e inwardly projectingly formed on the inner surfaces of the four corners of the projection cathode ray tube chamber 2c. Thus the projection cathode ray tube 1 is disposed in position on the frame 2. The pressing plate 5 is then inserted from the rear of the projection cathode ray tube 1, and mounted on the supporting portions 1b formed on the back surface of the projection cathode ray tube 1 through the elastic materials 7, respectively. The screws 6, each having the washer 10, the spring 9, and the spacer 8 fitted thereon in that order, are inserted into the respective holes 5a of the pressing plate 5 and are screwed into the respective frame attaching pillar portions 2l. Further, the screws 6 are tightened so as to make the washers 10 abut on the corresponding spacers 8, thereby fixing the pressing plat 5 and the frame 2 to each other by the spring force of the respective springs 9. Thus, the projection cathode ray tube 1 is pressed at its four corners by the spring force of the springs 9, respectively. Therefore, the projection cathode ray tube 1 is fixed on the step portion 2b of the frame 2 in a sealed state by the uniform force. It is easy to dispose the packing 4 in place on the frame 2, because the expanded portion 4a of the packing 4 is fitted in the slot $2b_1$ of the step portion 2b of the frame 2. Further, the contact area between the projection cathode ray tube 1 and the packing 4 is made large because the expanded portion 4a and the flat portion 4b of the packing 4 come into contact with the projection cathode ray tube 1, and the expanded portion 4a is substantially deformed when the projection cathode ray tube 1 is urged against the expanded portion 4a. Therefore, it is possible to keep a fluid-tight seal between the projection cathode ray tube 1 and the step portion 2b of the frame 2.

The lens 11 is mounted then onto the frame 2. First, the packing 12 is fitted on the collar portion 11c of the lens 11, and the lens 11 is mounted on the frame 2 so as to insert its one side having the packing 12 into the opening of the frame 2, and to insert the other side or curved surface side of the lens 11 into the cooling liquid chamber 2d of the frame 2. The small protrusions 11d formed at the four corners of the lens 11 are made to abut against the protrusions 2f of the frame 2, respectively, to thereby dispose the lens 11 in correct position on the frame 2. Thus, a predetermined positional relationship can be always maintained between the projection cathode ray tube 1 and the lens 11, both of which are disposed in position on the frame 2.

The lens adapter plate 13 is fitted on the lens 11, and the screws 14 are tightened into the protrusions 2f of the frame 2, so that the lens 11 is securely attached onto the frame 2. When the lens 11 is attached onto the frame 2 through this lens adapter plate 13, the collar portion 11c of the lens 11 is sandwiched between the packing 12 and the step portion 13b of the lens adapter plate 13. The packing 12 and the step portion 13b are disposed at the opposite side surfaces of the collar portion 11c, so that the whole collar portion 11c of the lens 11 is pressed uniformly. Accordingly, no bending stress is exerted onto the collar portion 11c of the lens 11, so that the lens 11 is not damaged. Further, the lens 11 has a cross section in plan view in the shape of a circle cut at four edges at right angles to be rectangular. Therefore the lens 11 can be reduced in size, even where the lens 11 has a large radius of curvature. Accordingly, it is possible to dispose the projection cathode ray tubes more closely adjacent to each other, so that the respective optical axes of the projection cathode ray tubes are made substantially equal in length to each other. This makes it possible to make the color tone more uniform in intensity.

Further, the lens 11 is shaped to be substantially rectangular in plan view to with substantially perpendicular wall portions 11b. As a result, there is a possibility that projection light rays from the lens 11 may be reflected by the perpendicular wall portions 11b to interfere with other such rays. Therefore, in this embodiment, light-shading portions 13a each having a size substantially the same as the perpendicular wall portion 11b are formed on the lens adapter plate 13 and are coated to prevent reflection. The respective light-shading portions 13a are arranged on the respective inner surfaces of the perpendicular wall portions 11b of the lens 11 to prevent the projection light from being reflected, so that no interfering light is generated.

The diaphragm 15 is fitted onto the pressure regulating chamber 2g of the frame 2 and the fastening ring 16 is fastened onto the frame 2 by screws to thereby fix the diaphragm 15 on the frame 2. The cap 17 is attached onto the opening of the fastening ring 16.

The cooling liquid A is poured into the cooling liquid pouring hole 2i of the frame 2 so as to fill a space defined by the diaphragm 15, the projection face of the projection cathode ray tube 1, and the curved surface of the lens 11, with the cooling liquid A. There is a possibility that air may remain in an upper portion of the space after the space has been filled with the cooling liquid A. Therefore, in this embodiment, the taper surface 2j is formed in the lower surface of the cooling liquid pouring hole 2i so that air can be discharged out of the cooling liquid pouring hole 2i along the taper surface 2j. As a result, air never remains in the space, and the space is completely filled with the cooling liquid A. The packing 3 is attached onto the cooling liquid pouring hole 2i by a screw 3a to seal the cooling liquid A.

Although the cooling liquid pouring hole 2i is sealed by the packing 3 and the screw 3a in this embodiment, alternatively, a hollow rubber member with a flange may be used. That is, the hollow rubber member may be inserted into the cooling liquid pouring hole 2i, and a plug made of stainless steel, aluminum alloy, brass, or the like, may be fitted into a hollow portion of the hollow rubber member. In this case, an expanded portion is formed on an inner periphery of the hollow portion of the hollow rubber member at a lower portion of the rubber member to be projected down from the lower surface of the cooling liquid pouring hole 2i. The expanded portion is extended outward when the plug is tightened into the hollow portion to thereby tightly seal the lower surface of the cooling liquid pouring hole 2i. This improves the sealing of the cooling liquid pouring hole 2i.

When this cooling liquid A is sealed, if a signal is applied to the projection cathode ray tube 1 and the projection cathode ray tube 1 is heated, the cooling liquid A is expanded. However, the expansion of the cooling liquid A can be absorbed by the diaphragm 15, so that an excess pressure is not applied to the projection cathode ray tube 1 and the lens 11. Further, the temperature of the cooling liquid A is kept lower than a predetermined value, because the cooling liquid A is circulated in the space to be cooled by the frame 2.

Furthermore, if the temperature of the cooling liquid A is increased, the lens 11 is heated and expanded, thereby causing the four corners of the lens 11 to abut against the protrusions 2f of the frame 2. Thus, stress is exerted onto the lens 11 with a corresponding risk of damage to the lens 11. In this embodiment, however, the small protrusions 11d are formed at the four corners of the lens 11. The small protrusions may be deformed to avoid the exertion of stress on the lens 11, and prevent the lens 11 from being damaged.

As described above, according to the present invention, the lens has a large radius of curvature. The lens is cut-off to have a rectangular shape in plan view so as to be in accord with the projection face of the projection cathode ray tube. Thus, a plurality of projection devices can be disposed close to each other, thereby making it possible to obtain a picture having an excellent color tone with no color shift (a picture is changed in color depending on the viewing direction). Further, the perpendicular wall portions are formed in the four cut-off sides, respectively, to form a space between the perpendicular wall portions and the projection cathode ray tube. This space is filled with the cooling liquid, so that the cooling liquid can act not only as a lens, but also as a cooling member. Thus, the number of parts and the cost of the apparatus can be reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A projection apparatus for a projection television receiver, comprising:
    a projection tube for receiving video signals and projecting images therefrom;
    a lens aligned for focusing images from said projection tube, said lens including an enlarged collar having a raised portion;
    a frame for supporting said projection tube in alignment with said lens and defining a cooling chamber between said lens and said projection tube;
    first sealing means for sealing said lens to said frame in a fluid-tight manner, said first sealing means including a resilient lens seal disposed between said lens collar and said frame and first pressing means for pressing said lens against said frame under a substantially uniform pressure with no substantial bending stress on said lens, said first pressing means including an adapter plate sized for close fitting relationship over said collar, wherein said raised portion of said lens collar abuts said adapter plate in substantially direct alignment with said lens seal when said lens collar is pressed against said lens seal by said adapter plate; and
    second sealing means for sealing said projection tube to said frame, said second sealing means including second pressing means for pressing said projection tube against said frame under uniform pressure, said second pressing means including spring means.

2. The apparatus of claim 1 wherein said second sealing means includes a resilient tube seal disposed between said projection tube and said frame.

3. The apparatus of claim 1, further including pressure regulating means to control the pressure of a cooling fluid maintained between said projection tube and said lens.

4. The apparatus of claim 1, wherein said projection tube includes a face, and wherein said lens and said projection tube face are substantially rectangular.

5. A projection apparatus for a projection television receiver, comprising:
    a projection tube for receiving video signals and projecting images therefrom;
    a lens aligned for focusing images from said projection tube, said lens having a substantially curved central portion of a predetermined radius of curvature and four cut-off sides of a substantially uniform thickness extending from said central portion, adjacent ones of said sides being substantially perpendicular to each other, and an enlarged collar disposed at end portions of said sides;
    a frame for supporting said projection tube in alignment with said lens and defining a cooling chamber between said lens and said projection tube;
    first sealing means for sealing said lens to said frame in a fluid-tight manner, said first sealing means including a resilient lens seal disposed between said lens collar and said frame and first pressing means for pressing said lens against said frame under a substantially uniform pressure with no substantial bending stress on said lens, said first pressing means including an adapter plate sized for close fitting relationship over said collar; and
    second sealing means for sealing said projection tube to said frame, said second sealing means including second pressing means for pressing said projection tube against said frame under uniform pressure.

6. The apparatus of claim 5 wherein said collar includes an annular wall surrounding said lens, the portions of said wall adjacent to said sides being substantially perpendicular to said sides.

* * * * *